US012132354B2

(12) United States Patent
Chowdhury et al.

(10) Patent No.: US 12,132,354 B2
(45) Date of Patent: Oct. 29, 2024

(54) ELECTRIC MOTOR HAVING STACKED DIFFERENT ROTOR SEGMENTS AND METHOD FOR DESIGNING THE SAME

(71) Applicant: HL MANDO CORPORATION, Pyeongtaek-si (KR)

(72) Inventors: Mazharul Chowdhury, Midland, MI (US); Md Sariful Islam, Bay City, MI (US); Mohammad Islam, Bay City, MI (US)

(73) Assignee: HL MANDO CORPORATION, Gyeonggi-Do (KR)

( * ) Notice: Subject to any disclaimer, the term of this patent is extended or adjusted under 35 U.S.C. 154(b) by 97 days.

(21) Appl. No.: 17/061,568

(22) Filed: Oct. 1, 2020

(65) Prior Publication Data

US 2022/0109339 A1 Apr. 7, 2022

(51) Int. Cl.
*H02K 1/02* (2006.01)
*H02K 1/24* (2006.01)
(Continued)

(52) U.S. Cl.
CPC ............ *H02K 1/2766* (2013.01); *H02K 1/02* (2013.01); *H02K 1/246* (2013.01); *H02K 21/14* (2013.01); *H02K 29/03* (2013.01)

(58) Field of Classification Search
CPC .................. H02K 29/03; H02K 1/246; H02K 1/27–2791; H02K 1/2792–2798
See application file for complete search history.

(56) References Cited

U.S. PATENT DOCUMENTS

| 4,110,646 | A |   | 4/1978 | Rao |
| 5,903,080 | A | * | 5/1999 | Nashiki ................. H02K 29/03 310/168 |

(Continued)

FOREIGN PATENT DOCUMENTS

| CN | 109687616 A | * | 4/2019 | ........... H02K 1/2766 |
| CN | 111092503 A | * | 5/2020 | |

(Continued)

OTHER PUBLICATIONS

Machine Translation of CN 111092503 A (Year: 2020).*

(Continued)

*Primary Examiner* — Eric Johnson
(74) *Attorney, Agent, or Firm* — Womble Bond Dickinson (US) LLP (57) ABSTRACT

A rotor assembly of a motor is configured to be rotatable relative to a stator. The rotor assembly may comprise a permanent magnet rotor segment comprising permanent magnets, the permanent magnet rotor segment configured to be rotatable by a magnetic field generated by the permanent magnets; and a reluctance rotor segment comprising flux barriers, the reluctance rotor segment configured to be rotatable by magnetic reluctance formed by the flux barriers. The permanent magnet rotor segment and the reluctance rotor segment are axially stacked relative to each other so that at least a part of a first torque ripple generated by the permanent magnet rotor segment and at least a part of a second torque ripple generated by the reluctance rotor segment can cancel each other. The permanent magnet rotor segment may be a rare earth permanent magnet rotor, and the reluctance rotor segment may be a synchronous reluctance rotor.

16 Claims, 11 Drawing Sheets

(51) Int. Cl.
*H02K 1/276* (2022.01)
*H02K 21/14* (2006.01)
*H02K 29/03* (2006.01)

(56) References Cited

U.S. PATENT DOCUMENTS

| | | | |
|---|---|---|---|
| 10,211,692 | B2 | 2/2019 | Kuo et al. |
| 11,456,633 | B2 * | 9/2022 | Takahashi ............... H02K 1/276 |
| 2003/0042814 | A1 * | 3/2003 | Tagome ................. H02K 1/276 |
| | | | 310/156.08 |
| 2019/0173336 | A1 * | 6/2019 | Takeuchi ............... H02K 1/246 |
| 2021/0013753 | A1 * | 1/2021 | Paul ....................... H02K 21/14 |
| 2021/0249920 | A1 * | 8/2021 | Sugiura ................... H02K 1/24 |
| 2021/0265882 | A1 * | 8/2021 | Mitsuda ............... H02K 1/2766 |

FOREIGN PATENT DOCUMENTS

| | | | | |
|---|---|---|---|---|
| JP | 2000175390 | A * | 6/2000 | |
| WO | WO-2015163640 | A1 * | 10/2015 | ............... H02K 1/06 |
| WO | WO-2021024517 | A1 * | 2/2021 | |

OTHER PUBLICATIONS

Sekine, Machine Translation of JP2000175390, Jun. 2000 (Year: 2000).*
Choi et al., Machine Translation of WO2015163640, Oct. 2015 (Year: 2015).*
Liu et al., Machine Transaltion of CN109687616, Apr. 2019 (Year: 2019).*
Misawa et al., Machine Translation of WO2021024517, Feb. 2021 (Year: 2021).*

* cited by examiner

ELECTRIC MOTOR HAVING STACKED DIFFERENT ROTOR SEGMENTS AND METHOD FOR DESIGNING THE SAME

BACKGROUND

Various embodiments of the present disclosure relate in general to an electric motor, and more particularly, to a structure and components of rotor and stator assemblies of a motor to improve motor performance, reduce torque ripple and increase output torque.

An electric motor is a well-known electrical machine that converts electrical energy into mechanical energy using magnetic field linkage. Permanent magnet electric motors are known for their high efficiency. The permanent magnet motors are also known for their durability, controllability, and absence of electrical sparking. Due to their advantages the permanent magnet motors are widely used in automobile applications.

However, one of the well-known problems of the permanent magnet motor is torque ripple. Sources of torque ripple in the permanent magnet motors include inherent harmonics in the flux linkage, and cogging. Cogging may be a term used to describe the torque of the permanent magnet motor disconnected from the power source. Presence of harmonics in the flux linkage results in instantaneous torque that pulsates as a function of the rotor position. Torque ripple may be generally undesirable in many permanent magnet motors applications, particularly at low speed.

It is with respect to these and other general considerations that the following embodiments have been described. Also, although relatively specific problems have been discussed, it should be understood that the embodiments should not be limited to solving the specific problems identified in the background.

SUMMARY

The features and advantages of the present disclosure will be more readily understood and apparent from the following detailed description, which should be read in conjunction with the accompanying drawings, and from the claims which are appended to the end of the detailed description.

According to some embodiments of the present disclosure, a rotor assembly of a motor configured to be rotatable relative to a stator may comprise: a permanent magnet rotor segment comprising permanent magnets, the permanent magnet rotor segment configured to be rotatable by a magnetic field generated by the permanent magnets; and a reluctance rotor segment comprising a plurality of flux barriers, the reluctance rotor segment configured to be rotatable by magnetic reluctance formed by the flux barriers. The permanent magnet rotor segment and the reluctance rotor segment are axially stacked relative to each other so that at least a part of a first torque ripple generated by the permanent magnet rotor segment and at least a part of a second torque ripple generated by the reluctance rotor segment can cancel each other. The permanent magnet rotor segment axially stacked relative to the reluctance rotor segment may generate the first torque ripple which is reverse torque ripple against the second torque ripple generated by the reluctance rotor segment axially stacked relative to the permanent magnet rotor segment. The reluctance rotor segment axially stacked relative to the permanent magnet rotor segment may generate the second torque ripple which is reverse torque ripple against the first torque ripple generated by the permanent magnet rotor segment axially stacked relative to the reluctance rotor segment.

The reluctance rotor segment axially stacked relative to the permanent magnet rotor segment may not include the permanent magnets in the flux barriers. Alternatively, material different from a core of the reluctance rotor segment (e.g. magnetic or non-magnetic material) may be disposed in the flux barriers of the reluctance rotor segment axially stacked relative to the permanent magnet rotor segment. For instance, one or more other magnets, for example, but not limited to, ferrite magnets, may be disposed in the flux barriers of the reluctance rotor segment axially stacked relative to the permanent magnet rotor segment.

The permanent magnet rotor segment axially stacked relative to the reluctance rotor segment may comprise magnet retention slots, wherein the permanent magnets are disposed in or on the magnet retention slots. The permanent magnets of the permanent magnet rotor segment axially stacked relative to the reluctance rotor segment may comprise one or more rare earth permanent magnets. The permanent magnet rotor segment axially stacked relative to the reluctance rotor segment may comprise one or more other flux barriers around a central-pole axis of the permanent magnet rotor segment. A pole of the permanent magnet rotor segment axially stacked relative to the reluctance rotor segment may comprise one or more of the permanent magnets forming a V shape.

The reluctance rotor segment axially stacked relative to the permanent magnet rotor segment may be a synchronous reluctance rotor.

The reluctance rotor segment axially stacked relative to the permanent magnet rotor segment may comprise: the flux barriers configured to oppose magnetic flux in a first direction; and flux paths formed between the flux barriers, the flux paths configured to direct the magnetic flux in a second direction different from the first direction. For example, the flux paths may be configured to direct magnet flux along a central-pole axis of the reluctance rotor segment. In some examples, each of the flux barriers of the reluctance rotor segment axially stacked relative to the permanent magnet rotor segment may comprise: a middle barrier part substantially perpendicular to an interpole axis of the reluctance rotor segment; and one or more end barrier parts angled toward an outer surface of the reluctance rotor segment.

A length of the reluctance rotor segment may be different from a length of the permanent magnet rotor segment. Alternatively, a length of the reluctance rotor segment may be identical to a length of the permanent magnet rotor segment.

This Summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Various embodiments in accordance with the present disclosure will be described with reference to the drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF EMBODIMENTS

In the following detailed description, reference is made to the accompanying drawings which form a part of the present disclosure, and in which are shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the invention. The following detailed description is therefore not to be taken in a limiting sense, and the scope of the invention is defined only by the appended claims and equivalents thereof. Like numbers in the figures refer to like components, which should be apparent from the context of use.

Permanent magnet motors with rare-earth magnets may be used for vehicles. The rare-earth permanent magnet motors exhibit high torque density and constant power operation in a wide speed range. However, due to the high cost of rare-earth magnets and to the limited supply, the permanent magnet motors with rare-earth magnets are becoming quite expensive. And, they introduce torque ripple and togging torque. To address these issues, in some exemplary embodiments of the present disclosure, a plurality of different rotor segments including a permanent magnet rotor segment and a synchronous reluctance rotor segment may be combined or stacked to form a rotor of a motor. The combining or stacking of the permanent magnet rotor segment with the synchronous reluctance rotor segment in the motor rotor may reduce the torque ripple and cogging torque of the rotor in the overall operating range of the motor during the operation of the motor by cancelling or intervening each other's torque ripple. Furthermore, because the synchronous reluctance rotor segment of the rotor may not have a rare-earth permanent magnet, the manufacturing cost of the motor may be decreased. However, as discussed below, the rare earth permanent magnet rotor segment may be replaced with any rotor having a permanent magnet, and the synchronous reluctance rotor segment may be replaced with any reluctance type rotor.

Figure 1:
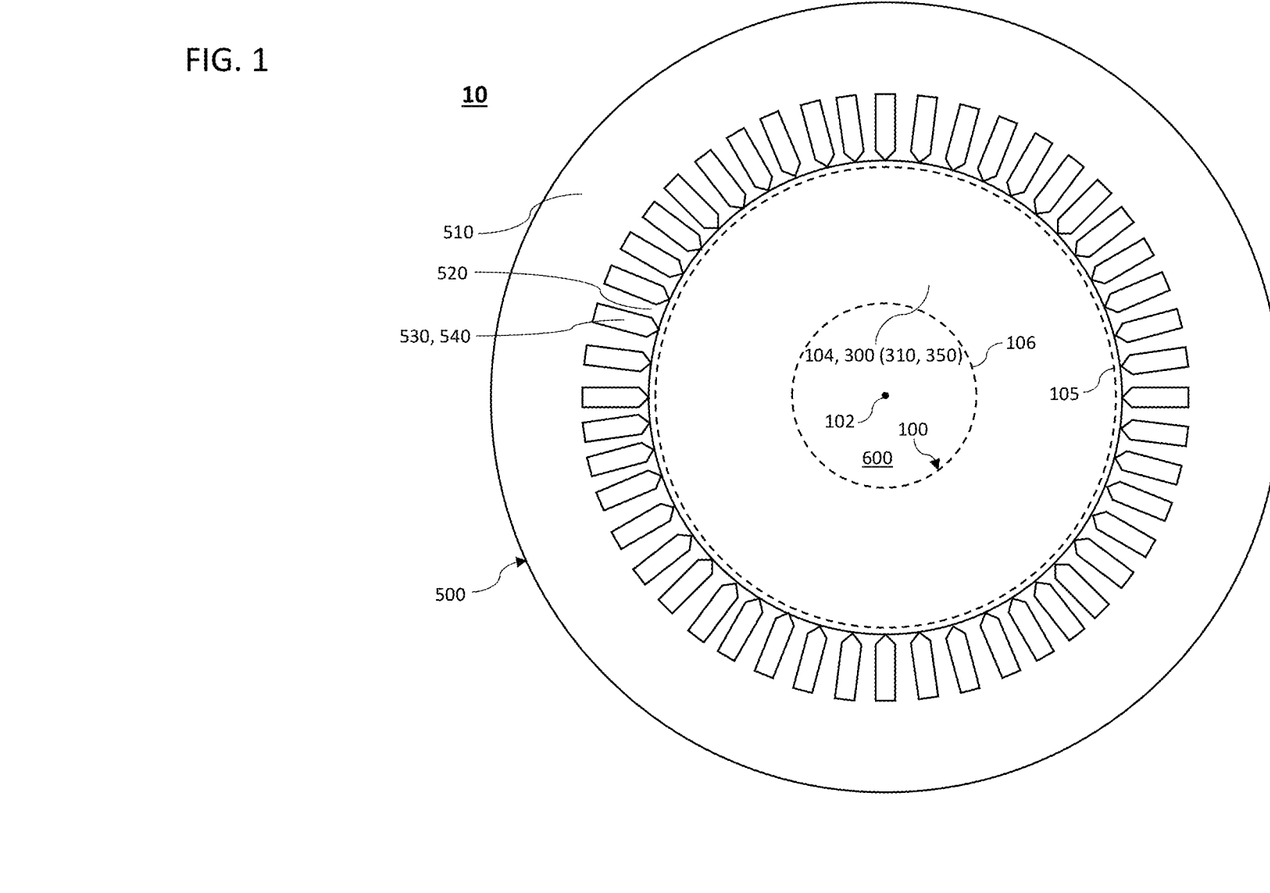
FIG. 1 is a horizontal cross-sectional view of a stator assembly of a motor according to an exemplary embodiment of the present disclosure.

FIG. 1 is a horizontal cross-sectional view of a stator assembly of a motor according to an exemplary embodiment of the present disclosure.

An electric motor 10 includes a rotor assembly 100, a stator assembly 500, and a rotor shaft 600. The rotor assembly 100 is disposed for rotation within, and relatively to, the stator assembly 500. The rotor assembly 100 may be rotatably seated on or fixed to the rotor shaft 600. Alternatively, the rotor assembly 100 may be disposed outside the stator assembly 500 to define an exterior rotor motor. The rotor assembly 100 and the stator assembly 500 each may be disposed about and extend along a central axis 102. The rotor assembly 100 may be disposed concentric with the stator assembly 500.

The stator assembly 500 includes a stator core 510. The stator core 510 may be generally cylindrical in shape and extends along the central axis 102. The stator core 510 may include a substantially circular outer surface. An inner surface of the stator core 510 may be formed by a plurality of stator teeth 520. The stator teeth 520 may be arranged circumferentially and may protrude toward the rotor assembly 100. The inner surface of the stator core 510 may form a cavity within the stator assembly 500 that is configured to receive the rotor assembly 100.

Stator slots 530 may be defined by the adjacent pair of stator teeth 520 that form the respective slot. The stator slots 530 may be formed in the stator core 510 of the stator assembly 500. The stator slots 530 may be designed and dimensioned to receive conductors 540. The conductors 540 may be placed in the stator slots 530 to form electromagnetic windings. For example, the conductors 540 may extend in the axial direction through the stator slots 530 or be disposed about (e.g., wound or slid about) the teeth 520 of the stator core 510. The stator slots 530 may have partially open slots such that small openings to the stator slots 520 are provided along the inner surface of the stator core 510.

Figure 4A:
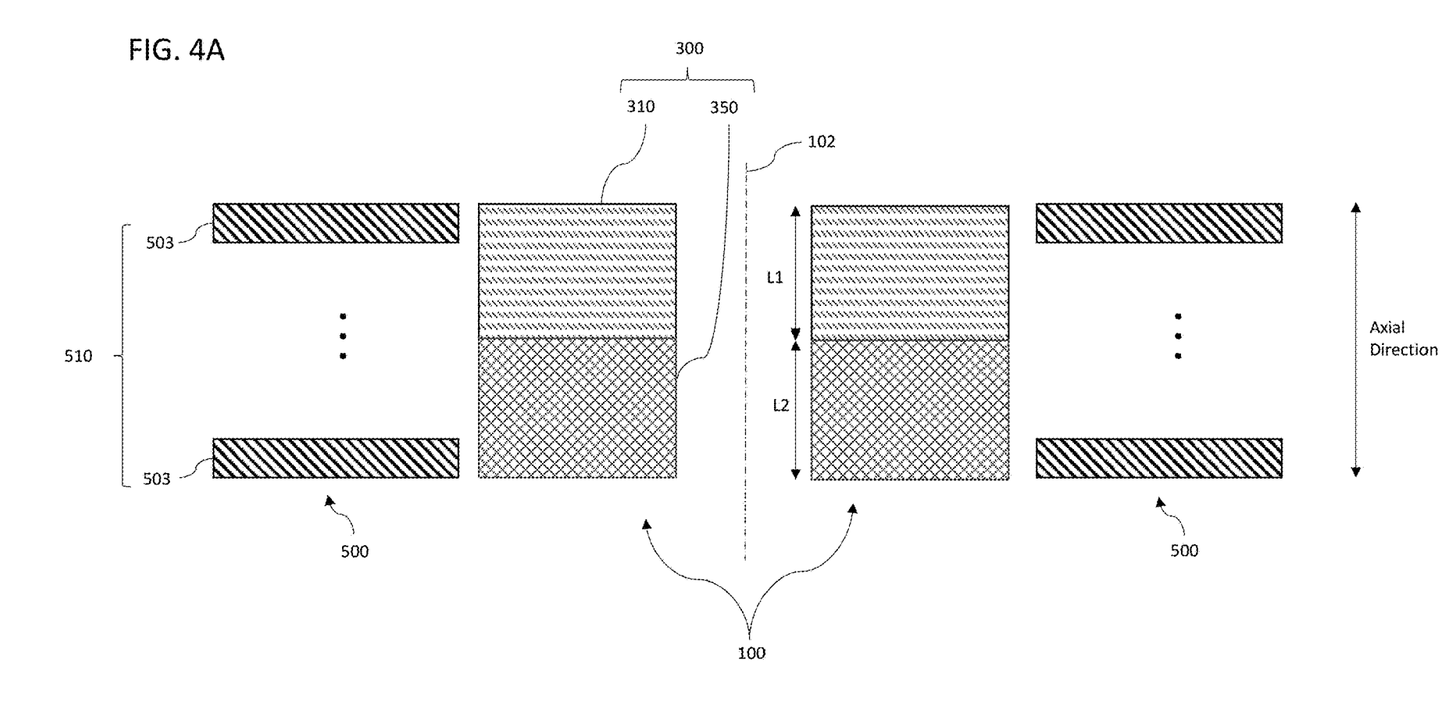
FIGS. 4A and 4B are vertical cross-sectional views of a motor according to exemplary embodiments of the present disclosure.
Figure 4B:
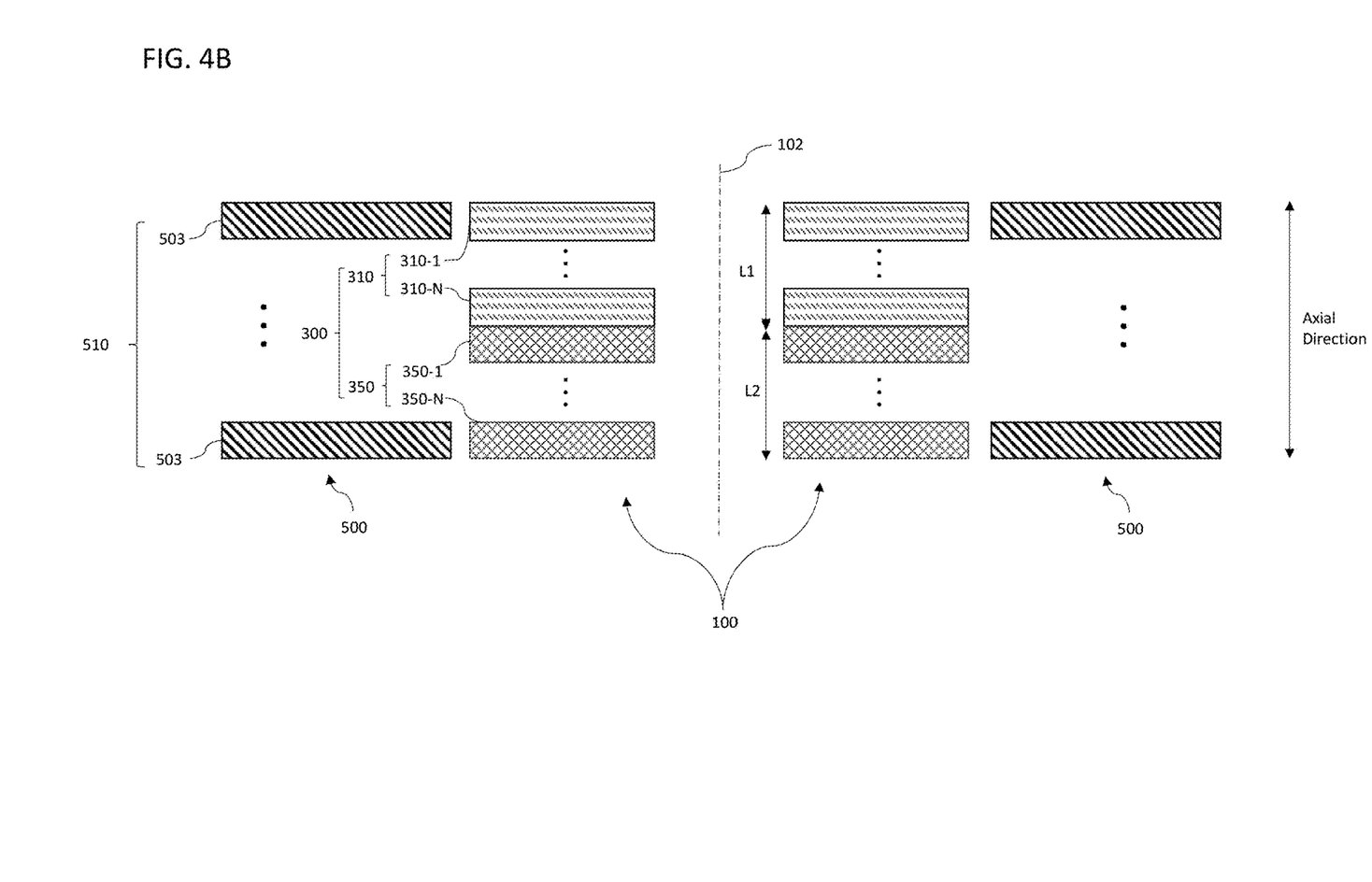

The stator assembly 500 may be comprised of the stator core 510 (e.g. iron core) made of a stack of stator laminations 503 of FIGS. 4A and 4B and a winding arrangement for the conductors 540 that carry an excitation current. Current flowing through the conductors 540 generates a stator electromagnetic flux. The stator flux may be controlled by adjusting the magnitude and frequency of the current flowing through the conductors 540.

However, the stator assembly 500 may be implemented in any type, shape, configuration, structure, and arrangement so that the stator assembly 500 can be optimized to achieve the required ripple and cogging performance.

The rotor assembly 100 may include a rotor core 104 that is disposed on the rotor shaft 600. The rotor core 104 may be made from ferrite materials, laminations or solid steel depending on the application requirements. The rotor core 104 may radially extend (relative to the central axis or rotor axis 102) between an inner rotor surface 106 and an outer rotor surface 105. The inner rotor surface 106 may be fixed to the rotor shaft 600 and may be disposed closer to the central axis 102 than the outer rotor surface 105. The rotor shaft 600 typically transfers the rotation energy to an external object. The outer rotor surface 105 may be spaced apart from the inner stator surface of the stator 500 by, for example, an air gap therebetween.

The rotor core 104 may include a plurality of rotor segments 300. The plurality of rotor segments 300 may have different rotor topologies from each other. Each of the plurality of rotor segments 300 may be axially stacked relative to one another along a rotor axis which may be the central axis 102.

In exemplary embodiments shown in FIGS. 4A and 4B, the plurality of rotor segments 300 may comprise a permanent magnet rotor segment 310 and a reluctance rotor segment 350 that are axially stacked along the rotor axis 102. The permanent magnet rotor segment 310 is formed along the rotor axis 102 of the rotor core 104, and the reluctance rotor segment 350 is formed along the same axis 102 and is sequentially adjacent to the permanent magnet rotor segment 310. The combining or stacking of different rotor segments (e.g. the permanent magnet rotor segment 310 and the reluctance rotor segment 350) that are stacked relative to one another along the rotor axis 102 may cancel cogging by having individual rotor segments which provide cogging of substantially equal magnitude but in an opposite phase. Accordingly, the arrangement of combining or stacking different rotor segments may improve cogging torque, and ripple in shaft torque.

Figure 2:
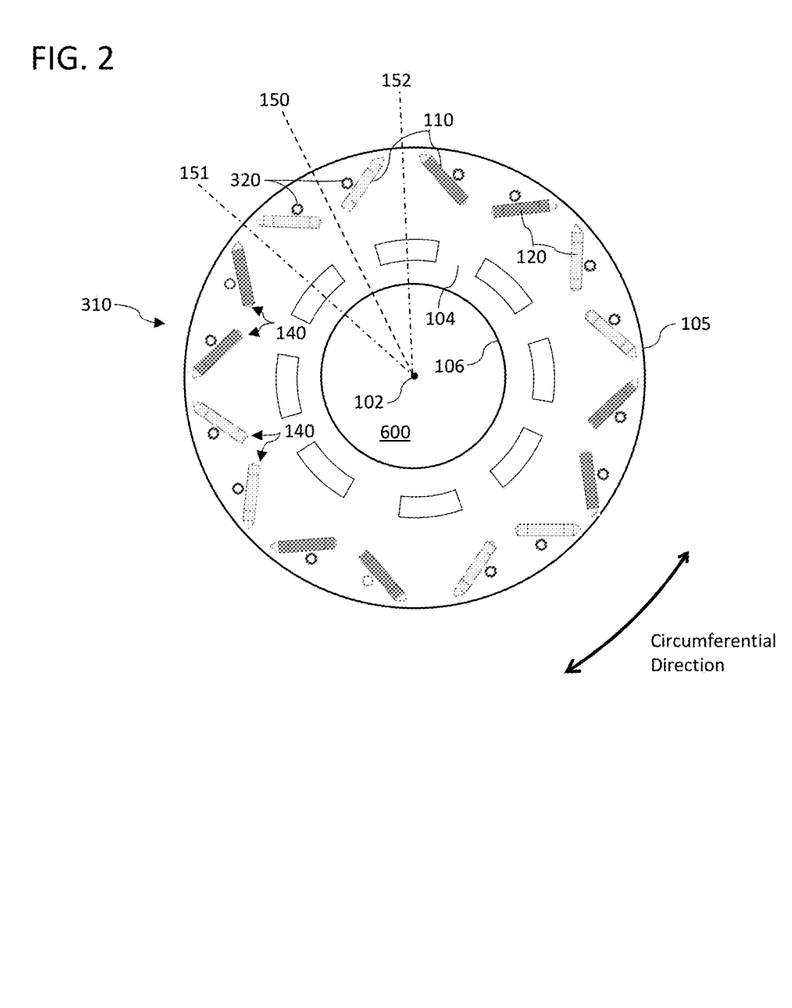
FIG. 2 is a horizontal cross-sectional view of a permanent magnet rotor segment of a rotor assembly of a motor according to an exemplary embodiment of the present disclosure.

FIG. 2 is a horizontal cross-sectional view of a permanent magnet rotor segment of a rotor assembly of a motor according to an exemplary embodiment of the present disclosure.

Figure 3A:
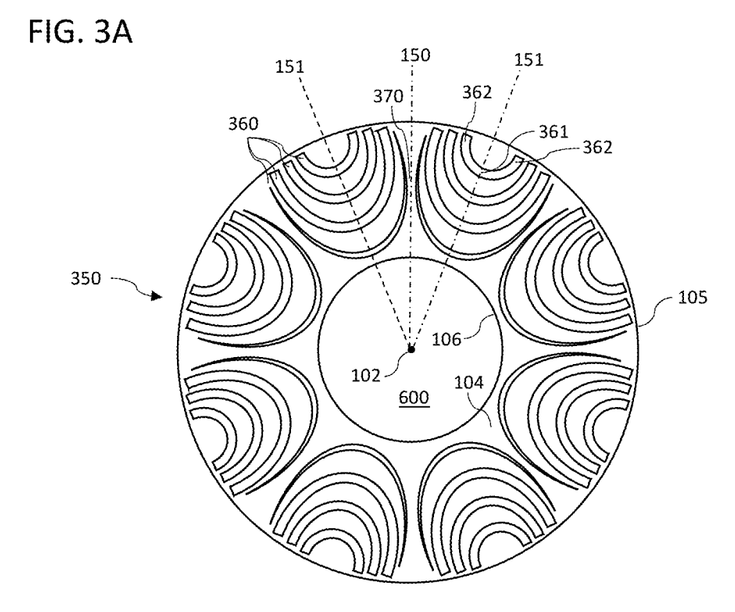
FIGS. 3A and 3B are horizontal cross-sectional views of a reluctance rotor segment of a rotor assembly of a motor according to exemplary embodiments of the present disclosure.
Figure 3B:
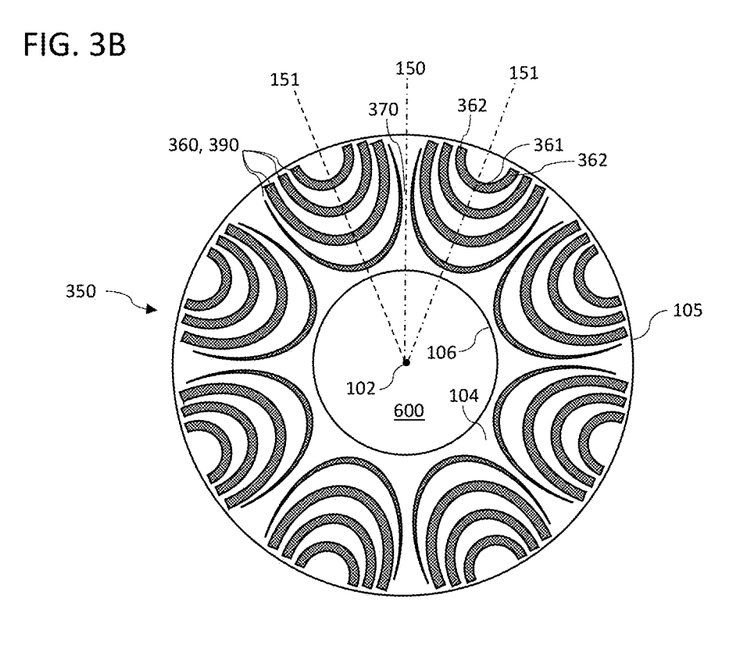

The permanent magnet rotor segment 310 of FIG. 2 is axially stacked relative to the reluctance rotor segment 350 of FIG. 3A or 3B along the rotor axis 102 as shown in FIGS. 4A and 4B. The permanent magnet rotor segment 310 of the rotor assembly 100 is constructed with permanent magnets 120. The permanent magnets 120 provide magnetic poles on the permanent magnet rotor segment 310. The permanent magnet rotor segment 310 may be configured to be rotatable by a magnetic field generated by the permanent magnets 120. An electromagnetic flux created by the permanent magnets 120 of the permanent magnet rotor segment 310 interacts with an electromagnetic flux created by the conductors 540 in the stator assembly 500. The interaction of the fluxes causes the permanent magnet rotor segment 310 to rotate.

The plurality of magnet retention slots 110 are formed in or on the permanent magnet rotor segment 310. For example, the permanent magnets 120 may be imbedded in the permanent magnet rotor segment 310 (an interior permanent magnet type rotor), or the permanent magnets 120 may be attached to the outer surface 105 of the permanent magnet rotor segment 310 (a surface-mounted permanent magnet type rotor). The plurality of magnet retention slots 310 may be circumferentially spaced apart about the permanent magnet rotor segment 310. Each magnet retention slot 110 of the permanent magnet rotor segment 310 is arranged to receive and hold one or more permanent magnets 120. One or more of the permanent magnets 120 of the permanent magnet rotor segment 310 may be a rare earth permanent magnet. However, the permanent magnet 120 may be any high temperature magnet having higher coercivity, higher grade or higher operable temperature, for example, but not limited to, samarium cobalt (Sm—Co) magnet or neodymium iron boron (Nd—Fe—B) magnet, or high energy density permanent magnet, or any type of magnet which is appropriate for operation of the motor 10. The permanent magnet 120 may be a rectangular bar type to optimize the usage of the high temperature magnet and reduce the cost, although the permanent magnet 120 can have any shape for a necessary operation of the motor 10.

The magnet retention slots 110 may extend substantially through a partial or entire length of the permanent magnet rotor segment 310.

In an exemplary embodiment shown in FIG. 2, one pole 140 may comprise a pair of two adjacent magnet retention slots 110 forming V-shape, where one or more permanent magnets 120 are inserted into each magnet retention slot 110. As described above, one or more of the permanent magnets 120 may be rare-earth permanent magnets, although it is not required. The magnets 120 of the V shaped magnet retention slots 110 have same or similar magnetic poles that cooperate to form a magnetic pole 140 of the rotor assembly 100. Other constructions could employ for various configurations such as a spoke-type, a bar-type, an I-type, or any appropriate type. Adjacent pair of two magnet retention slots 110 may be formed and disposed symmetrically. Alternatively, one of the pair of two magnet retention slots 110 may be positioned, shaped, and sized asymmetrically to the other of the pair of two magnet retention slots 110. The pair of the magnet retention slots 110 cooperate with the outer surface 105 of the rotor core 104.

A pole location may be generally defined by a center-pole axis 150 (e.g. direct axis or d-axis) that extends radially from the rotor axis 102 toward the outer surface 105 of the permanent magnet rotor segment 310 along a midpoint between adjacent magnet retention slots 110. The interpolar axes 151, 152 (e.g. quadrature axis or q-axis) may extend radially from the rotor axis 102 toward the outer surface 105 of the rotor assembly 100 between adjacent poles. The q-axis is shown as 22.5 mechanical degrees from the d-axis, and the q-axis is separated by 90 electrical degrees. Each pole 140 may have an associated surface area on the outer circumferential surface 105 of the permanent magnet rotor segment 310. Each pole 140 may be represented by the arc length on the surface between adjacent inter-polar axes 151, 152.

The permanent magnet rotor segment 310 may further comprise one or more flux barriers 320 may be positioned around the central-pole axis 150. The flux barriers 320 may define magnetic flux passages and thereby operate to guide the magnetic flux in a desired direction. The flux barriers 320 positioned around the central-pole axis 150 may reduce the ripple in torque and cogging torque. The flux barriers 320 may be optimized to achieve better performance of the motor 10 such as reduction in torque ripple and increase in the output torque or speed of the motor 10. The flux barriers 320 may extend through the entire or part of the permanent magnet rotor segment 310. The flux barriers 320 may be an air hole. Non-magnetic material (e.g. nylon, epoxy, potting material or other filler material) could be positioned or injected into the flux barriers 320.

FIGS. 3A and 3B illustrate horizontal cross-sectional views of a reluctance rotor segment of a rotor assembly of a motor according to exemplary embodiments of the present disclosure.

Figure 3C:
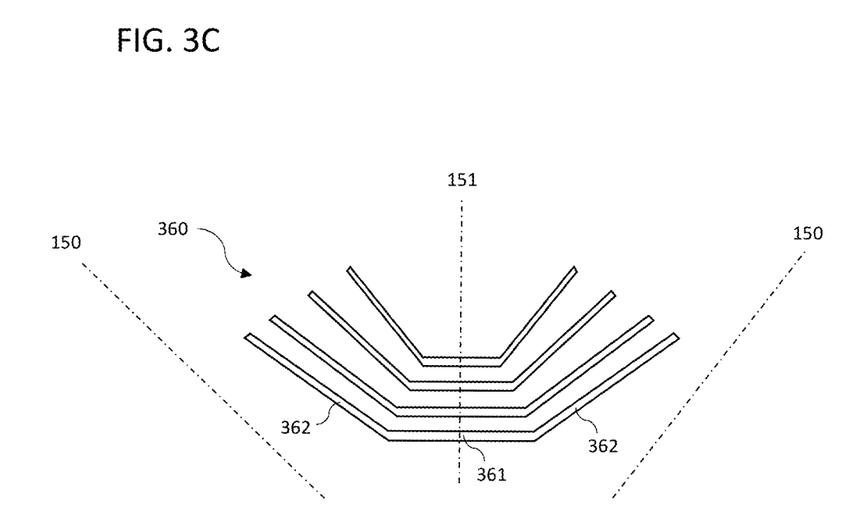
FIGS. 3C and 3D show flux barriers of a reluctance rotor segment according to other exemplary embodiments of the present disclosure.
Figure 3D:
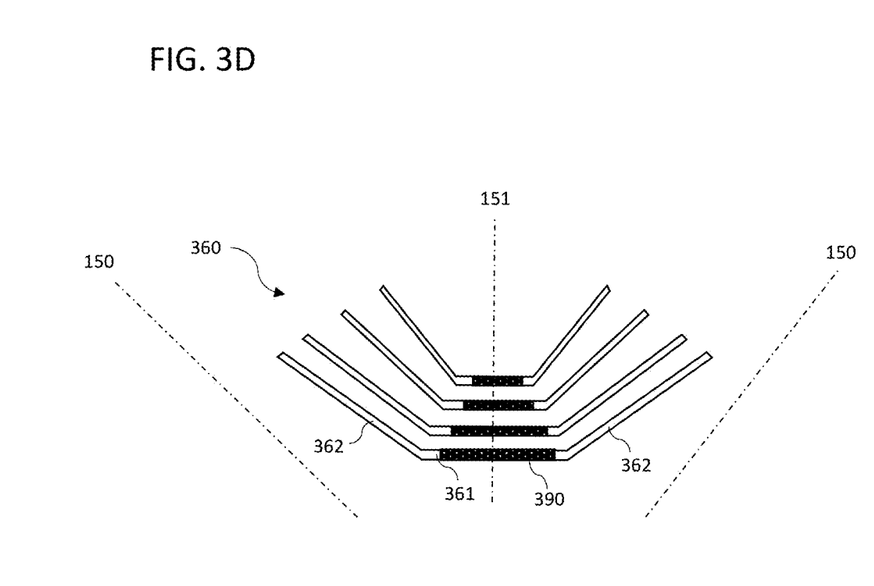

The reluctance rotor segment 350 of FIG. 3A or 3B is axially stacked relative to the permanent magnet rotor segment 310 of FIG. 2 along the rotor axis 102 as shown in FIGS. 4A and 4B. The reluctance rotor segment 350 operably associated with the stator assembly 500 may be configured to generate rotor torque through magnetic reluctance. The reluctance rotor segment 350 may be constructed with flux barriers 360 to induce non-permanent magnetic poles by increasing the reluctance (i.e. the capability of opposing the magnetic flow passage) along some direction, favoring instead others (i.e. the paths more characterized by the presence of iron). The flux barriers 360 may be an air gap. Non-magnetic material (e.g. nylon, epoxy, potting material or other filler material) could be positioned or injected into the flux barriers 360 to increase the mechanical strength of the reluctance rotor segment 350. The reluctance rotor segment 350 may not comprise any windings or permanent magnets. For example, the reluctance rotor segment 350 may not include a rare-earth permanent magnet. Alternatively, as shown in FIGS. 3B and 3D, material 590 different from the core 104 of the reluctance rotor segment 350 may be inserted within the rotor flux barriers 560 to assist the operation and performance of the reluctance rotor segment 350 improving its capabilities, but avoiding to use rare-earth permanent magnets. The material 590 disposed in the flux barriers 320 may improve torque density and may help in increasing both the average torque and the power factor. For example, the material 590 may be any magnetic or non-magnetic material, for example, but not limited to, a ferrite magnet.

The reluctance rotor segment 350 may be a synchronous reluctance type rotor. The synchronous reluctance type rotor is configured to rotate by a toque generated due to the inequality of permeance (or magnetic conductivities) by quadrature and direct axes of the rotor. The synchronous reluctance type rotor may have poles with an equal number of stator poles. The synchronous reluctance type rotor may operate at synchronous speeds without current-conducting parts. However, the reluctance rotor segment 350 may be implemented as various types, for example, but not limited to, variable reluctance rotor, switched reluctance rotor, variable stepping reluctance rotor, and any appropriate reluctance type rotor that can provide reverse ripple against the torque ripple generated by the permanent magnet rotor segment 310 in order to effectively cancel the cogging torque generated by the permanent magnet rotor segment 310.

The flux barriers 360 are configured to oppose the magnetic flux in a first direction, and flux paths 370 formed between two adjacent flux barriers 360 are configured to direct the magnetic flux in a second direction different from the first direction. The flux paths 370 extend along a different direction from the flux barriers 360. For example, the flux barriers 360 obstruct flux lines along interpolar axis 151 (e.g. quadrature axis or q-axis) of the reluctance rotor segment 350 while the flow paths 370 direct the magnet flux along the central-pole axis 150 (e.g. direct axis or d-axis) of the reluctance rotor segment 350. In exemplary embodiments shown in FIGS. 3A and 3B, each of the flux barriers 360 comprises a middle barrier part 361 substantially perpendicular to the interpolar axis 151 (e.g. quadrature-axis). End barrier parts 362 of the flux barriers 360 extending from the middle barrier part 361 may be angled toward the outer surface 105 of the reluctance rotor segment 350. The flux barriers 360 illustrated in FIGS. 3A and 3B may be replaced with those of FIGS. 3C and 3D. The flux barriers 360 can be varied in any shape, size, number, configuration, and position to increase the output torque of the motor 10 and decrease the torque ripple or cogging torque of the rotor assembly 100.

The lengths of each of the permanent magnet rotor segment 310 and the reluctance rotor segment 350 may be optimized to maximize the performance of the motor 10 and the reduction in torque ripple of the rotor assembly 100 during the operation of the motor 10. The permanent magnet rotor segment 310 has a first rotor segment axial length, L1, relative to the rotor axis 102. The reluctance rotor segment 310 has a second rotor segment axial length, L2, relative to the rotor axis 102. The first rotor segment axial length L1 of the permanent magnet rotor segment 310 and the second rotor segment axial length L2 of the reluctance rotor segment 350 are varied to reduce cogging toque of the rotor assembly 100 that leads to a reduction in torque ripple. The second rotor segment axial length L2 of the reluctance rotor segment 350 may be different from the first rotor segment axial length L1 of the permanent magnet rotor segment 310. Alternatively, the second rotor segment axial length L2 of the reluctance rotor segment 350 may be the same as the first rotor segment axial length L1 of the permanent magnet rotor segment 310. In other words, each of the permanent magnet rotor segment 510 and the reluctance rotor segment 350 may have a substantially equal axial length, which is approximately half of the total length of the rotor axis 102.

As shown in FIG. 4A, each of the permanent magnet rotor segment 310 and the reluctance rotor segment 350 may be formed as a single piece. Alternatively, as illustrated in FIG. 4B, the permanent magnet rotor segment 310 and the reluctance rotor segment 350 may be implemented as multiple laminations, respectively. First multiple laminations 310-1 to 310-N may form the permanent magnet rotor segment 310, and second multiple lamination 350-1 to 350-M may form the core of the reluctance rotor segment 350. The first multiple laminations 310-1 to 310-N of the permanent magnet rotor segment 310 and the second multiple lamination 350-1 to 350-M of the reluctance rotor segment 350 may be arranged in an axially stacked relationship. For example, the first multiple laminations 310-1 to 310-N of the permanent magnet rotor segment 310 and the second multiple lamination 350-1 to 350-M of the reluctance rotor segment 350 may be stacked along the rotor axis 102. Any number of laminations in a given design may be used, depending on design choice.

The topologies, shapes, sizes, configurations and axial lengths L1 and L2 of the permanent magnet rotor segment 310 and the reluctance rotor segment 350 may be selected to cause a net sum of torque ripple produced by each of the permanent magnet rotor segment 310 and the reluctance rotor segment 350 to be minimized or substantially equal to zero during an operation of the motor 10 while the output torque of the motor 10 may be maximized.

Figure 5A:
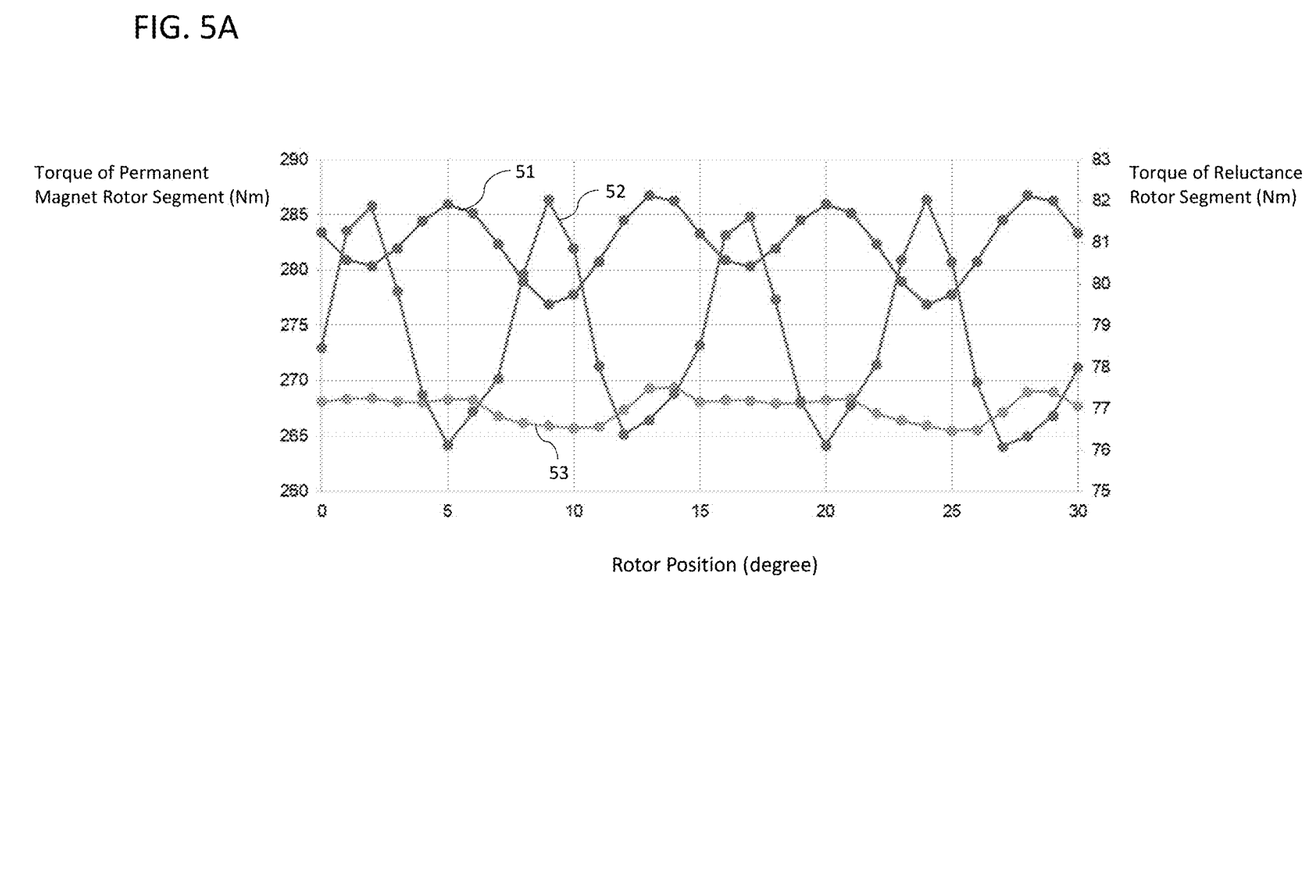
FIG. 5A is a graph illustrating a ripple performance of a motor during low speed operation according to an exemplary embodiment of the present disclosure.
Figure 5B:
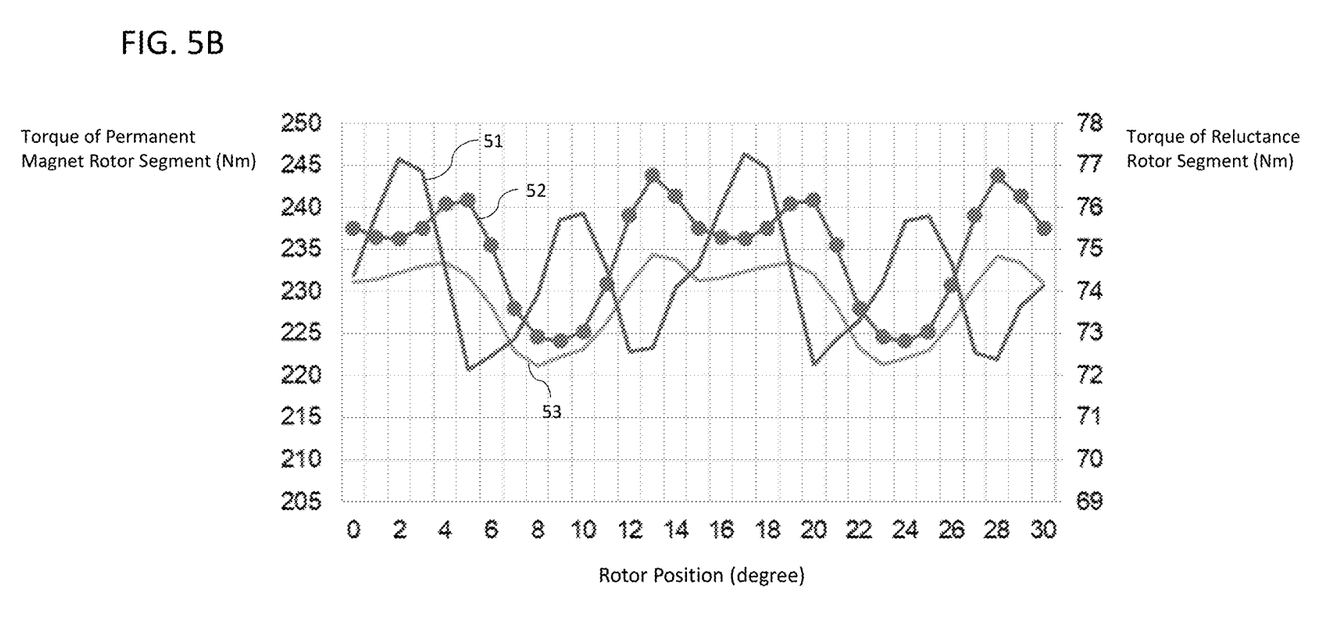
FIG. 5B is a graph illustrating a ripple performance of a motor during high speed operation according to an exemplary embodiment of the present disclosure.

According to some embodiments of the present disclosure, the arrangement of stacking or combining the permanent magnet rotor segment 510 and the reluctance rotor segment 520 may effectively reduce torque ripple. FIG. 5A is a graph illustrating a ripple performance of the motor 10 during low speed operation according to an exemplary embodiment of the present disclosure, and FIG. 5B is a graph illustrating a ripple performance of the motor 10 during high speed operation according to an exemplary embodiment of the present disclosure. Line 51 represents torque of the permanent magnet rotor segment 510, line 52 represents torque of the reluctance rotor segment 520, and line 53 represents net output torque of the rotor assembly 100 having the combination of the permanent magnet rotor segment 510 and the reluctance rotor segment 520. As illustrated in FIGS. 5A and 5B, the first torque ripple of the permanent magnet rotor segment 510 indicated by line 51 and the second torque ripple of the reluctance rotor segment 520 indicated by line 52 provide reverse torque ripple against each other so that the net output torque 53 of the rotor assembly 100, which is the sum of the torque 51 of the permanent magnet rotor segment 510 and the torque 52 of the reluctance rotor segment 520, can achieve reduction in torque ripple. At least a part of the first torque ripple generated by the permanent magnet rotor segment 510 and at least a part of the second torque ripple generated by the reluctance rotor segment 520 may cancel each other. Therefore, the combining or stacking of the permanent magnet rotor segment with the synchronous reluctance rotor segment in the motor rotor may reduce the torque ripple and cogging torque of the rotor in the overall operating range of the motor during the operation of the motor by cancelling or intervening each other's torque ripples.

Figure 6:
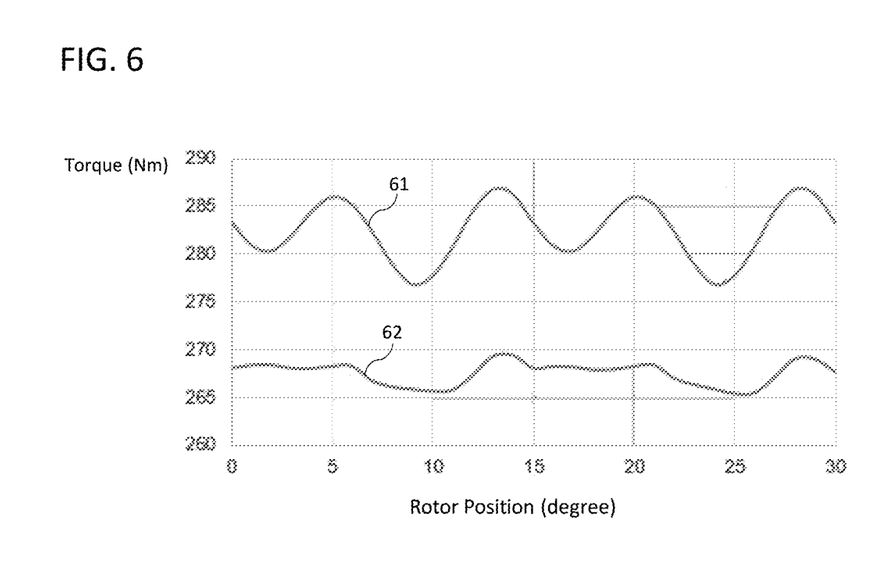
FIG. 6 is a graph showing comparison of ripple between a single type rotor consisted of a permanent magnet type rotor only and a hybrid type rotor according to an embodiment of the present disclosure.

FIG. 6 is a graph showing comparison of ripple between a single type rotor consisted of a permanent magnet type rotor only and a hybrid type rotor having the combination of the permanent magnet rotor segment 510 and the reluctance rotor segment 520. Line 61 represents the torque of the single type rotor consisted of the permanent magnet type rotor, and line 62 represents a combined torque produced by the hybrid type rotor 100 having the permanent magnet rotor segment 510 and the reluctance rotor segment 520 according to an exemplary embodiment of the present disclosure. FIG. 6 shows that the peak-peak ripple of the single type rotor consisted of the permanent magnet type rotor is 11 Nm while the peak-peak ripple of the hybrid type rotor having the permanent magnet rotor segment 510 and the reluctance rotor segment 520 is 4 Nm. Accordingly, the hybrid type rotor reduces the torque ripple by at least 7 Nm comparing with the single type rotor. Therefore, compared to the single topology type rotor, the hybrid type rotor according to some exemplary embodiments of the present disclosure may exhibit lower torque ripple during the operation of the motor.

However, the arrangement of stacking or combining the permanent magnet rotor segment 510 and the reluctance rotor segment 520 may not reduce the resulting torque output of the motor 10 by an acceptable amount.

According to certain exemplary embodiments of the present disclosure, because a rare-earth permanent magnet is imbedded in or on one rotor segment (e.g. the permanent magnet rotor segment 310 of the rotor 100) but not in another or other rotor segments (e.g. the synchronous reluctance rotor segment 350 of the rotor 100), the manufacturing cost of the motor 10 may be decreased. The motor 10 having the hybrid type rotor with different rotor segments may be conveniently and easily manufactured with little additional cost and little or no increase in package size.

Although the example embodiments have been described in detail, it should be understood that various changes, substitutions and alterations can be made herein without departing from the spirit and scope of the application as defined by the appended claims.

Moreover, the scope of the present application is not intended to be limited to the particular embodiments of the process, machine, manufacture, and composition of matter, means, methods and steps described in the specification. As one of ordinary skill in the art will readily appreciate from the disclosure, processes, machines, manufacture, compositions of matter, means, methods or steps, presently existing or later to be developed, that perform substantially the same function or achieve substantially the same result as the corresponding embodiments described herein may be utilized according to the embodiments and alternative embodiments. Accordingly, the appended claims are intended to include within their scope such processes, machines, manufacture, compositions of matter, means, methods, or steps.

What is claimed is:

1. A rotor assembly of a motor configured to be rotatable relative to a stator, the rotor assembly comprising:
a permanent magnet rotor segment comprising permanent magnets, the permanent magnet rotor segment configured to be rotatable by a magnetic field generated by the permanent magnets; and
a reluctance rotor segment comprising a plurality of flux barriers, the reluctance rotor segment configured to be rotatable with the permanent magnet rotor segment,
wherein the permanent magnet rotor segment and the reluctance rotor segment are axially stacked relative to each other so that at least a part of a first torque ripple generated by the permanent magnet rotor segment and at least a part of a second torque ripple generated by the reluctance rotor segment cancel each other,
wherein the permanent magnet rotor segment axially stacked relative to the reluctance rotor segment further comprises a plurality of other flux barriers of which shapes are different from shapes of the flux barriers of the reluctance rotor segment,
wherein the plurality of other flux barriers comprised in the permanent magnet rotor segment axially stacked relative to the reluctance rotor segment are located at positions which are different from positions where the plurality of flux barriers comprised in the reluctance rotor segment axially stacked relative to the permanent magnet rotor segment are located, and
wherein each of the flux barriers of the reluctance rotor segment axially stacked relative to the permanent magnet rotor segment comprises: a straightly extended middle barrier part substantially perpendicular to an interpole axis of the reluctance rotor segment; and straightly extended end barrier parts angled toward an outer surface of the reluctance rotor segment, wherein the straightly extended end barrier parts of each of the flux barriers are angled at angles different from each other, respectively, and non-magnetic material different from a core of the reluctance rotor segment is disposed only in the straightly extended middle barrier part disposed between the straightly extended end barrier parts,
wherein each of the flux barriers of the reluctance rotor segment is empty except for the non-magnetic material and the straightly extended end barrier parts are enclosed by the outer surface of the reluctance rotor segment.

2. The rotor assembly of the motor of claim 1, wherein the reluctance rotor segment axially stacked relative to the permanent magnet rotor segment is a synchronous reluctance rotor.

3. The rotor assembly of the motor of claim 1, wherein the permanent magnets of the permanent magnet rotor segment axially stacked relative to the reluctance rotor segment comprise one or more rare earth permanent magnets.

4. The rotor assembly of the motor of claim 1, wherein the permanent magnet rotor segment axially stacked relative to the reluctance rotor segment comprises one or more other flux barriers around a central-pole axis of the permanent magnet rotor segment.

5. The rotor assembly of the motor of claim 1, wherein a pole of the permanent magnet rotor segment axially stacked relative to the reluctance rotor segment comprises one or more of the permanent magnets forming a V shape.

6. The rotor assembly of the motor of claim 1, wherein the reluctance rotor segment axially stacked relative to the permanent magnet rotor segment comprises: flux paths configured to direct magnet flux along a central-pole axis of the reluctance rotor segment; and the flux barriers extending along a different direction from the flux paths.

7. The rotor assembly of the motor of claim 1, wherein at least one of the flux barriers of the reluctance rotor segment axially stacked relative to the permanent magnet rotor segment comprises a part substantially perpendicular to an interpole axis of the reluctance rotor segment.

8. The rotor assembly of the motor of claim 1, wherein the reluctance rotor segment axially stacked relative to the permanent magnet rotor segment generates the second torque ripple which is reverse torque ripple against the first torque ripple generated by the permanent magnet rotor segment axially stacked relative to the reluctance rotor segment.

9. The rotor assembly of the motor of claim 1, wherein the permanent magnet rotor segment axially stacked relative to the reluctance rotor segment generates the first torque ripple which is reverse torque ripple against the second torque ripple generated by the reluctance rotor segment axially stacked relative to the permanent magnet rotor segment.

10. The rotor assembly of the motor of claim 1, wherein a length of the reluctance rotor segment is different from a length of the permanent magnet rotor segment.

11. The rotor assembly of the motor of claim 1, wherein a length of the reluctance rotor segment is identical to a length of the permanent magnet rotor segment.

12. The rotor assembly of the motor of claim 1, wherein the permanent magnet rotor segment axially stacked relative to the reluctance rotor segment comprises magnet retention slots, wherein the permanent magnets are disposed in or on the magnet retention slots.

13. The rotor assembly of the motor of claim 1, wherein a size of the non-magnetic material disposed only in the straightly extended middle barrier part of one flux barrier located radially inward than an other flux barrier of the flux barriers among the plurality of the flux barriers is larger than a size of the non-magnetic material disposed only in straightly extended the middle barrier part of the other flux barrier located radially outward than the one flux barrier among the plurality of the flux barriers.

14. A rotor assembly of a motor configured to be rotatable relative to a stator, the rotor assembly comprising:
a rare earth permanent magnet rotor segment comprising rare earth permanent magnets; and
a synchronous reluctance rotor segment comprising a plurality of flux barriers and not comprising the rare earth permanent magnets,
wherein the rare earth permanent magnet rotor segment and the synchronous reluctance rotor segment are axially stacked relative to each other,
wherein the rare earth permanent magnet rotor segment axially stacked relative to the synchronous reluctance rotor segment further comprises a plurality of other flux barriers of which shapes are different from shapes of the flux barriers of the synchronous reluctance rotor segment, and
wherein the plurality of other flux barriers comprised in the rare earth permanent magnet rotor segment axially stacked relative to the synchronous reluctance rotor segment are located at positions which are different from positions where the plurality of flux barriers comprised in the synchronous reluctance rotor segment axially stacked relative to the rare earth permanent magnet rotor segment are located, and
wherein each of the flux barriers of the synchronous reluctance rotor segment axially stacked relative to the rare earth permanent magnet rotor segment comprises: a straightly extended middle barrier part substantially perpendicular to an interpole axis of the synchronous reluctance rotor segment; and straightly extended end barrier parts angled toward an outer surface of the synchronous reluctance rotor segment, wherein the straightly extended end barrier parts of each of the flux barriers are angled at angles different from each other, respectively, and non-magnetic material different from a core of the synchronous reluctance rotor segment is disposed only in the straightly extended middle barrier part disposed between the straightly extended end barrier parts,
wherein each of the flux barriers of the reluctance rotor segment is empty except for the non-magnetic material and the straightly extended end barrier parts are enclosed by the outer surface of the reluctance rotor segment.

15. The rotor assembly of the motor of claim 14, wherein at least a part of a first torque ripple generated by the rare earth permanent magnet rotor segment and at least a part of a second torque ripple generated by the synchronous reluctance rotor segment cancel each other.

16. The rotor assembly of the motor of claim 14, wherein one or more of other flux barriers are disposed around a central-pole axis of the rare earth permanent magnet rotor segment.

* * * * *